(12) United States Patent
Goldberg

(10) Patent No.: US 8,406,481 B2
(45) Date of Patent: Mar. 26, 2013

(54) AUTOMATED INDEXING FOR DISTRIBUTING EVENT PHOTOGRAPHY

(75) Inventor: David A. Goldberg, Boulder, CO (US)

(73) Assignee: Hysterical Sunset Limited, Grand Cayman (KY)

( * ) Notice: Subject to any disclaimer, the term of this patent is extended or adjusted under 35 U.S.C. 154(b) by 1219 days.

(21) Appl. No.: 11/816,959

(22) PCT Filed: Feb. 23, 2006

(86) PCT No.: PCT/US2006/006697

§ 371 (c)(1),
(2), (4) Date: Aug. 27, 2008

(87) PCT Pub. No.: WO2006/091869

PCT Pub. Date: Aug. 31, 2006

(65) Prior Publication Data

US 2008/0310688 A1    Dec. 18, 2008

Related U.S. Application Data

(60) Provisional application No. 60/656,764, filed on Feb. 25, 2005.

(51) Int. Cl.
*G06K 9/00* (2006.01)
(52) U.S. Cl. ........................................ 382/118
(58) Field of Classification Search ............. 707/706
See application file for complete search history.

(56) References Cited

U.S. PATENT DOCUMENTS

| | | | |
|---|---|---|---|
| 2,375,113 A | 5/1945 | Klammet et al. | |
| 2,852,407 A | 9/1958 | Wood, Jr. et al. | |
| 2,944,586 A | 7/1960 | Yanulis | |
| 3,281,259 A | 10/1966 | Lux et al. | |
| 3,498,865 A | 3/1970 | Paquin et al. | |
| 3,551,199 A | 12/1970 | Forster | |
| 3,570,748 A | 3/1971 | Coyle et al. | |

(Continued)

FOREIGN PATENT DOCUMENTS

| | | |
|---|---|---|
| EP | 0644032 | 3/1995 |
| EP | 1288798 | 3/2003 |

(Continued)

OTHER PUBLICATIONS

International Search Report prepared by the U.S. International Searching Authority dated Sep. 25, 2006; PCT/US2006/006697; Applicant, Youfinder Intellectual Property Licensing Limited.

(Continued)

*Primary Examiner* — Claire X Wang
(74) *Attorney, Agent, or Firm* — Sheridan Ross P.C.

(57) ABSTRACT

The present method relates to the automated indexing of event images for distribution. The automated indexing can use automated facial recognition to determine which people are in each image. The images indexed in this fashion can be presented in a gallery, ordered by characteristics of the people in the images such as their name or room number, so as to facilitate the selection of the images by the people. The identification of the people in the images can be assisted by security or other information regarding the people that may be available to the event manager. Furthermore, the closeness of the relationships of two people can be inferred from the degree to which the people are in the same images, allowing the people in the images to be placed into groups, which can be hierarchical and/or overlapping, and which can assist in the organization of images being presented to the people, either in a gallery or electronic display format.

12 Claims, 1 Drawing Sheet

U.S. PATENT DOCUMENTS

| | | | |
|---|---|---|---|
| 3,911,173 | A | 10/1975 | Sprague, Jr. |
| 3,924,013 | A | 12/1975 | Kane |
| 3,944,453 | A | 3/1976 | Chudgar et al. |
| 4,082,854 | A | 4/1978 | Yamada et al. |
| 4,097,893 | A | 6/1978 | Camras |
| 4,234,624 | A | 11/1980 | Linderoth et al. |
| 4,390,387 | A | 6/1983 | Mahn |
| 4,484,971 | A | 11/1984 | Wang |
| 4,525,414 | A | 6/1985 | Ohya et al. |
| 4,528,219 | A | 7/1985 | Yamada et al. |
| 4,559,095 | A | 12/1985 | Babbin |
| 4,636,609 | A | 1/1987 | Nakamata |
| 4,644,127 | A | 2/1987 | La Rocca |
| 4,791,598 | A | 12/1988 | Liou et al. |
| 4,861,404 | A | 8/1989 | Neff |
| 4,902,378 | A | 2/1990 | Ouderkirk et al. |
| 4,916,532 | A | 4/1990 | Streck et al. |
| 4,931,125 | A | 6/1990 | Volkmann et al. |
| 4,936,938 | A | 6/1990 | Simpson et al. |
| 4,941,193 | A | 7/1990 | Barnsley et al. |
| 4,954,393 | A | 9/1990 | Jones |
| 4,979,133 | A | 12/1990 | Arima et al. |
| 4,991,205 | A | 2/1991 | Lemelson |
| 5,056,034 | A | 10/1991 | Rucki et al. |
| 5,132,922 | A | 7/1992 | Khan et al. |
| 5,164,992 | A | 11/1992 | Turk et al. |
| 5,189,130 | A | 2/1993 | Kageyama |
| 5,213,900 | A | 5/1993 | Friedrich |
| 5,321,396 | A | 6/1994 | Lamming et al. |
| 5,326,173 | A | 7/1994 | Evans et al. |
| 5,348,604 | A | 9/1994 | Neff |
| 5,363,504 | A | 11/1994 | Hasuo |
| 5,381,155 | A | 1/1995 | Gerber |
| 5,432,864 | A | 7/1995 | Lu et al. |
| 5,493,677 | A | 2/1996 | Balogh et al. |
| 5,549,943 | A | 8/1996 | Vicik |
| 5,550,928 | A | 8/1996 | Lu et al. |
| 5,554,984 | A | 9/1996 | Shigenaga et al. |
| 5,566,327 | A | 10/1996 | Sehr |
| 5,572,596 | A | 11/1996 | Wildes et al. |
| 5,576,838 | A | 11/1996 | Renie |
| 5,598,208 | A | 1/1997 | McClintock |
| 5,602,375 | A | 2/1997 | Sunahara et al. |
| 5,629,981 | A | 5/1997 | Nerlikar |
| 5,655,053 | A | 8/1997 | Renie |
| 5,666,215 | A | 9/1997 | Fredlund et al. |
| 5,680,223 | A | 10/1997 | Cooper et al. |
| 5,699,449 | A | 12/1997 | Javadi |
| 5,796,428 | A | 8/1998 | Matsumoto et al. |
| 5,802,208 | A | 9/1998 | Podilchuk et al. |
| 5,840,147 | A | 11/1998 | Grimm |
| 5,947,369 | A | 9/1999 | Frommer et al. |
| 6,108,437 | A | 8/2000 | Lin |
| 6,217,695 | B1 | 4/2001 | Goldberg et al. |
| 6,389,181 | B2 | 5/2002 | Shaffer et al. |
| 6,430,307 | B1 | 8/2002 | Souma et al. |
| 6,526,158 | B1 | 2/2003 | Goldberg |
| 6,606,398 | B2 * | 8/2003 | Cooper .................. 382/118 |
| 6,801,641 | B2 | 10/2004 | Eraslan |
| 6,819,783 | B2 | 11/2004 | Goldberg et al. |
| 7,130,454 | B1 | 10/2006 | Berube et al. |
| 7,274,832 | B2 | 9/2007 | Nicponski |
| 7,277,891 | B2 | 10/2007 | Howard et al. |
| 7,561,723 | B2 | 7/2009 | Goldberg |
| 7,822,233 | B2 * | 10/2010 | Nagaoka et al. ............ 382/118 |
| 7,962,467 | B2 | 6/2011 | Howard et al. |
| 2002/0049728 | A1 | 4/2002 | Kaku |
| 2003/0118216 | A1 | 6/2003 | Goldberg |
| 2004/0008872 | A1 | 1/2004 | Goldberg |
| 2005/0100195 | A1 | 5/2005 | Li |

FOREIGN PATENT DOCUMENTS

| | | |
|---|---|---|
| JP | 2002-024229 | 4/2002 |
| WO | WO 95/24795 | 9/1995 |
| WO | WO 97/42793 | 11/1997 |
| WO | WO 98/10358 | 3/1998 |
| WO | WO 02/19137 | 3/2002 |
| WO | WO 2004/072897 | 8/2004 |

OTHER PUBLICATIONS

Written Opinion of the U.S. International Searching Authority dated Sep. 25, 2006; PCT/US2006/006697; Applicant, Youfinder Intellectual Property Licensing Limited.

Giergensohn et al. "Leveraging Face Recognition Technology to Find and Organize Photos," Proceedings of the 6th ACM SIGMM international workshop on Multimedia information retrieval MIR 04, Oct. 15, 2004, pp. 99-106.

Official Action for European Patent Application No. 06787260, dated Jun. 10, 2011 6 pages.

Das et al., "Automatic face-based image grouping for albuming", Systems, Man and Cybernetics, 2003. IEEE International Conference on; vol. 4, Oct. 5, 2003, pp. 3726-3731.

Longbin Chen et al., "Face annotation for family photo management", International Journal of Image and Graphics, World Scientific Publishing Co., Singapore, SG, vol. 3, No. 1, Dec. 30, 2002, pp. 81-94.

Lei Zhang et al., "Automated annotation of human faces in family albums", Proceedings of the 11th ACM International Conference on Multimedia, Berkley, CA, Nov. 4-6, 2003, vol. CONF. 11, Nov. 2, 2003, pp. 355-358.

U.S. Appl. No. 12/442,361, filed Mar. 20, 2009, Goldberg.

Loui et al., "Automated event clustering and quality screening of consumer pictures for digital albuming", IEEE Transactions on Multimedia, IEEE Service Center, Piscataway, NJ, US, vol. 5, No. 3, Sep. 1, 2003, pp. 390-402.

Extended Euopean Search Report for International (PCT) Patent Application No. PCT/US06/27323, mailed Jul. 27, 2009.

International Preliminary Report on Patentability for International (PCT) Patent Application No. PCT/US2006/027323, mailed Jan. 31, 2008.

English translation of Official Action for Japanese Patent Application No. 2006-503384, issued Oct. 21, 2008, 2 pages.

U.S. Appl. No. 09/712,879, filed Nov. 14, 2000, Goldberg.

International Search Report for International (PCT) Patent Application No. PCT/US97/15829, mailed Jan. 5, 1998.

International Preliminary Examination Report for International (PCT) Patent Application No. PCT/US97/15829, mailed Nov. 30, 1998.

International Search Report for International (PCT) Patent Application No. PCT/US97/07773, mailed Sep. 11, 1997.

Written Opinion for International (PCT) Patent Application No. PCT/US97/07773, mailed Apr. 15, 1998.

International Preliminary Examination Report for International (PCT) Patent Application No. PCT/US97/07773, mailed Sep. 16, 1998.

International Search Report for International (PCT) Patent Application No. PCT/USO4/03488, mailed Sep. 13, 2004.

Written Opinion for International (PCT) Patent Application No. PCT/USO4/03488, mailed Sep. 13, 2004.

International Preliminary Report on Patentability for International (PCT) Patent Application No. PCT/US04/03488, mailed Aug. 25, 2005.

International Search Report for International (PCT) Patent Application No. PCT/US06/27323, mailed Apr. 10, 2007.

Written Opinion for International (PCT) Patent Application No. PCT/US06/27323, mailed Apr. 10, 2007.

Supplementary European Search Report for European Patent Application No. 97940915.8, completed Sep. 19, 2000.

Official Action for European Patent Application No. 97940915.8, mailed Apr. 11, 2003.

Official Action for European Patent Application No. 97940915.8, mailed Oct. 21, 2004.

Decision to Refuse a European Patent Application for European Patent Application No. 97940915.8, mailed Jul. 11, 2005.

Supplementary European Search Report for European Patent Application No. 97926416.5, mailed Aug. 25, 2000.

Official Action for U.S. Appl. No. 09/242,987, mailed Jun. 20, 2002.
Official Action for U.S. Appl. No. 10/615,642, mailed Aug. 26, 2004.
Official Action for U.S. Appl. No. 09/187,446, mailed Jun. 23, 2000.
Official Action for U.S. Appl. No. 09/187,446, mailed Jun. 6, 2000.
Official Action for U.S. Appl. No. 09/187,446, mailed Mar. 21, 2000.
Kuchinsky et al., "FotoFile: A Consumer Multimedia Organization and Retrieval System," Proceedings of the SIGCHI conference on Human factors in computing systems: the CHI is the limit, p. 496-503, May 15-20, 1999, Pittsburgh, Pennsylvania, United States.

Official Action for European Patent Application No. 06787260.6, mailed Sep. 22, 2010.
Official Action for European Patent Application No. 06787260.6, dated Feb. 8, 2012 4 pages.
Official Action for U.S. Appl. No. 12/442,361, mailed Apr. 3, 2012 7 pages.

* cited by examiner

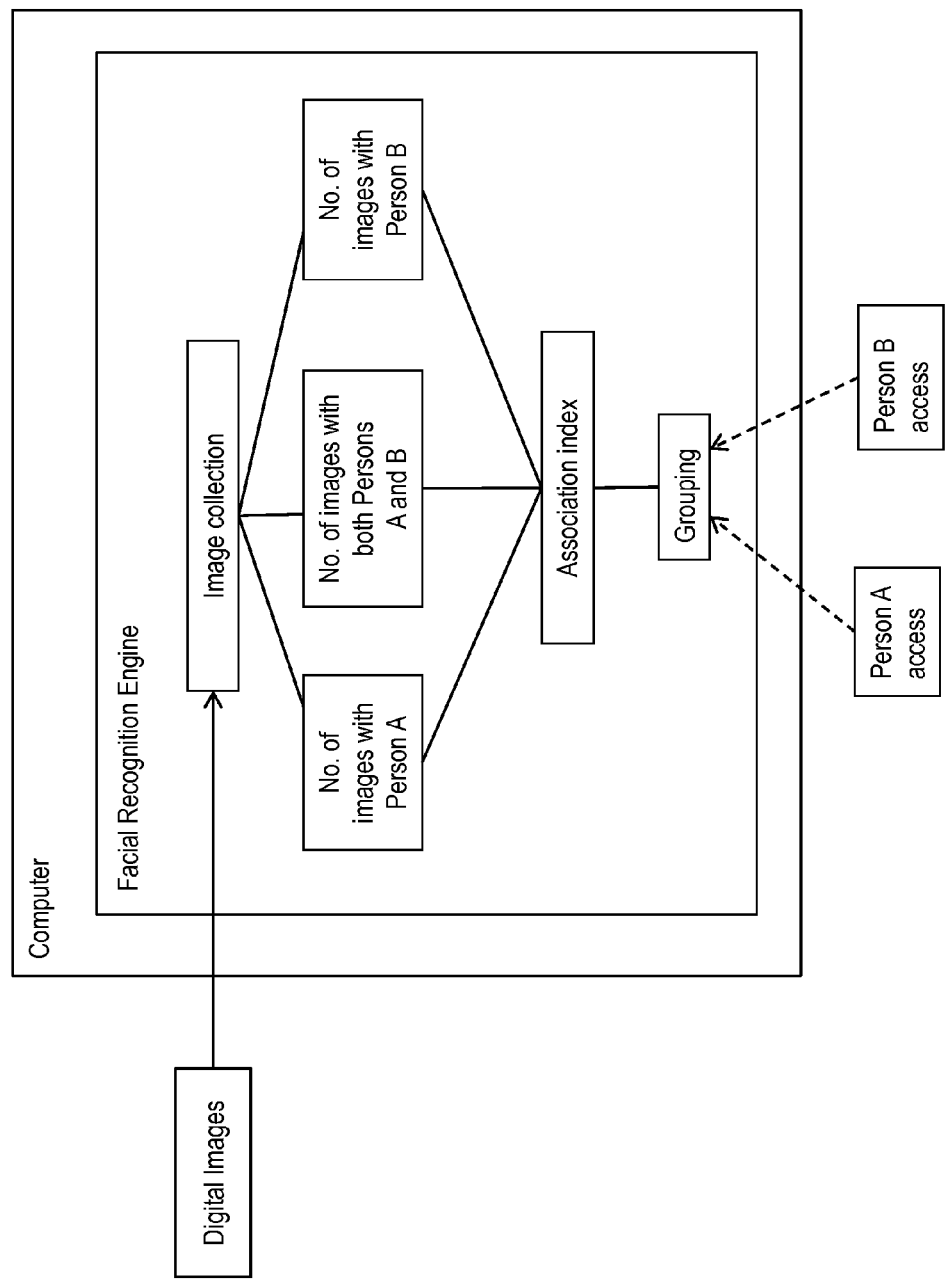

AUTOMATED INDEXING FOR DISTRIBUTING EVENT PHOTOGRAPHY

CROSS-REFERENCE TO RELATED APPLICATION

This application is a national-phase filing pursuant to 35 U.S.C. §371 of PCT International Application PCT/US06/06697 filed Feb. 23, 2006, which claims the benefit of U.S. Provisional Application No. 60/656,764 filed Feb. 25, 2005. The contents of each of the above identified applications are incorporated herein by reference.

TECHNICAL FIELD

The present invention relates to the automated indexing of event photography in order to facilitate the distribution of photographs.

BACKGROUND

Today, cruise passengers who want photographic mementos of their experience are forced to look through thousands of pictures presented in a gallery in order to find the few pictures of themselves and their family. This time-consuming process turns what should be an exciting and fun experience of viewing family photographs into a boring slog through thousands of photographs of strangers. This and similar forms of distribution are used in other forms of event photography as well, from ski slopes, at resorts, and at certain theme parks. These large galleries with undifferentiated photographs serve to frustrate patrons and to reduce sales. Furthermore, these forms of distribution prevent patrons from sharing images with others through email or online photo collections. Also, these distribution means prevent patrons from digitally proofing and altering photographs, as they now do with their image collections on home computers. Because patrons only buy what is already printed, they prevent patrons from selecting photographs for creating photo albums of their entire cruise, which albums could be in the form of virtual image albums that let patrons view and manage images more easily, or alternatively, as physical bound photographic albums. In addition, patrons cannot decide whether or not to share photographs with other people to whom they have a relationship as there are only a limited number of photographs printed, and galleries prevent patrons from protecting their photographs from casual exposure to unrelated people.

Some of these issues are addressed by the use of facial recognition in automatically indexing images. Facial recognition is well-known in the prior art, and a number of commercial facial recognition software programs are available, including those from Cognitec (Dresden, Germany), Identix (Minnetonka, Minn.) and Viisage (Billerica, Mass.). These companies produce facial recognition engines, which provide a simple result—given two faces, they provide a score that indicates the similarity of the two faces, or alternatively, the likelihood that the two faces come from the same person. These facial recognition engines are extremely accurate if the faces are presented in a standardized manner—the faces facing forward, glasses removed, with a neutral expression.

As the face deviates from this standard format, the accuracy of the facial recognition engine decreases substantially. In order to correct for these inaccuracies in the facial recognition engines, it is possible to assist the facial recognition engine using statistical regularities of the image collection. For example, on a cruise ship, related people tend to show up regularly in the same photographs. If a first person is recognized reliably in a photograph, it is likely that a second person who cannot be reliably recognized is in another photograph with the first person, thus aiding in the recognition. This improved indexing is described in U.S. Pat. No. 6,819,783 to Goldberg, et al.

The use of facial recognition in distributing images in event photography has been partially addressed in the prior art, and in particular, U.S. Pat. No. 6,526,158 to Goldberg describes the manner in which facial recognition can be used to collect images from patrons in a public venue and to provide these to the patron in response to a request from the patron.

Distributing event photographs to patrons in these public venues still presents important problems. For example, much of the prior art assumes that the interface between the patron and the distribution system is a computer, such as in a kiosk. However, many patrons do not either know how to use a computer, or are reluctant to do so. In addition, providing kiosks in sufficient numbers to handle patron flow could be too expensive, or there may not be sufficient room to do so. Furthermore, in selling, it is well-known that providing the patron with the actual product (in this case a photograph) is more effective than providing them with a facsimile of the product on a computer screen. Finally, for reasons of timing, production efficiencies of scale, or product quality (i.e. kiosk reproductions tend to be lower quality dye sublimation prints), it may be more effective to print a photograph in batch mode, rather than to wait for a patron to request the photograph in a computer interaction.

For these and other reasons, in many cases it is preferable to print collections of photographs in batch, and to present these to patrons. This can be difficult, however, because of the volume of photographs involved. In a cruise ship scenario, for example, tens of thousands of photographs can be taken during a week's cruise. In current practice, these photographs are placed into a gallery, where patrons are then asked to find their photographs. The time required to find these photographs is large and thereby discouraging to patrons, the patrons may not find all of their photographs thereby reducing sales. Furthermore, the cruise lines are forced to devote extra room to the gallery in order to handle the large number of photographs and to handle peak periods where hundreds of people can be in the gallery scanning for the photographs.

Another limitation of the distribution of event photography is that patrons are organized into hierarchical groups. That is, a woman might be on a cruise of thousands of people with her immediate family, which is part of a family reunion with her parents and the families of her two brothers, some of which are also part of a church group. The woman may want to see not only images of her immediate family, but also of the family reunion, or possibly of the entire church group. It would be useful if the woman could indicate which groups of people for which she is interested in seeing images—this is currently not possible, since it would be prohibitively difficult for her to indicate which of the thousands of people on the cruise that she did or did not want share photographs with. Accomplishing this task would be significantly facilitated if the system had a sense of the groups of which the woman was a member, and to allow her to make choices about those groups, rather than every individual person.

It is to these and other issues that the present invention is directed.

SUMMARY OF THE INVENTION

It is an object of the present invention to print images of patrons in a public venue so that they can be placed in a display according to characteristics of the people in the images, facilitating the patron finding their images.

It is further an object of the present invention to provide images of patron in event photography in an electronic display so that an individual person can choose a subset of the people in the entire collection whose images the individual person wishes to see.

It is also an object of the present invention to improve the accuracy of automated indexing of photographs in event photography.

It is additionally an object of the present invention to group the people in a collection of event images according to the closeness of their relationship, so that a patron can obtain not only the images directly related to a given person, but also obtain images of people related to the given person.

Additional objects, advantages and novel features of this invention shall be set forth in part in the description that follows, and will become apparent to those skilled in the art upon examination of the following specification or may be learned through the practice of the invention. The objects and advantages of the invention may be realized and attained by means of the instrumentalities, combinations, and methods particularly pointed out in the appended claims.

To achieve the foregoing and other objects and in accordance with the purposes of the present invention, as embodied and broadly described therein, the present invention is directed to a method for the presentation of photographs in a gallery of event photographs or patrons at an event, comprising obtaining images of patrons, indexing the images according to a characteristic of the patrons represented in the images, printing the images to produce photographs, during which a mark is placed on each photograph indicating the location in the gallery where the photograph is to be placed; and placing the photographs in the gallery according to the mark.

The characteristic can be a group to which the patron is a member, a unique identifier associated with each patron, or the indexing can be performed by automated facial recognition. There can be multiple patrons represented within a particular image, where the characteristics of the multiple patrons are different, and where the particular image is printed to produce multiple photographs, each with a separate mark for placement in different places in the gallery.

The present invention can also comprise a method for associating persons, who are represented in a collection of images, into a group, comprising computing an association index between a first person and a second person from a first number being the number of images in which the first person is represented and from a second number being the number of images in which the first and the second person are both represented, and grouping the first person and the second person in a group if the association index between the first and second person exceeds a certain predetermined threshold value.

Computing an association index can comprise determining the identities of the persons within each image using automated facial recognition. The association index can have as one of its terms the ratio of the first number and the second number. The ratio of the first and the second number can be raised to a predetermined power. Computing can further comprise computing a second association index between a first person and a second person from a third number being the number of images in which the second person is represented and from the second number.

Computing further also can comprise combining the association index between the first person and a third person with the association index between the third person and the second person. Combining the association indices can comprise multiplying a term related to the association index between the first person and the second person with a term related to the association index between the second person and the third person. Computing can further comprise combining the association indices of multiple chains of association between the first person and the second person.

The same access of images of the first person to the second person can be allowed as if the images were of the second person, if the first person and the second person are grouped in the same group. Access of images of the first person to the second person can be disallowed if the first person and the second person are not grouped in the same group.

A first group comprising the first person can be clustered with a second group comprising the second person by increasing the threshold value until the threshold value exceeds the association index between a person in the first group and a person in the second group.

In addition, the present invention can comprise a method for associating persons, who are represented in a collection of images, into a group, comprising creating a group comprised of a seed person, computing a test connectedness of the group additionally comprising a test person, admitting the test person to the group if the test connectedness exceeds a threshold, and continuing the steps of computing and admitting until there are no additional persons who can be added to the group.

Computing can comprise a ratio of a measure of the number of times persons in the group are represented in the same image to a power of the number of persons in the group, wherein the power is greater than zero and less than or equal to 1. The threshold can be the connectedness of the group without the test person.

DESCRIPTION OF THE DRAWINGS

FIG. 1 is a schematic diagram of one embodiment of the present invention showing a computing system comprising a facial recognition engine.

BEST MODES FOR CARRYING OUT THE INVENTION

Terminology

A "photograph" means a physical representation of a person, such as might be printed by silver process, dye sublimation, or other process on a paper substrate.

An "image" of a person means a representation of a person, which can be electronic (e.g. a JPG file) or physical (e.g. a photograph).

An "event" means an occasion at which people gather, which can be over a period of hours (e.g. a wedding) or a period of days (e.g. a cruise or a resort vacation).

A "patron" means a person attending an event.

An "occasion" means a discrete gathering of patrons at which images may be taken, which could be, for example, a wedding that occurs on a cruise (in which only a subset of the event patrons would be present) or the evening reception the night prior to a wedding (in which all patrons of the event would be present).

"Related" means two people who have a relationship such that it is possible that one person would want to purchase or obtain photographs of the other person. Related people do not need to have a symmetrical relationship—that is, the first person might wish to obtain photographs of the second person, but the second person might not want to obtain photographs of the first person. It should be noted that the relationship is not itself the wanting of the other person's photograph, but is a relationship that might give rise to such a desire (e.g. a family relationship, a friendship, being co-workers, attending the same church, etc.).

A "group" is a set of related people.

A "collection" means a set of images of many patrons at an event.

A "gallery" means a location where printed photographs of images in a collection are displayed for patrons at the event to use to find images that they wish to purchase.

An "identifier" is a code, which is normally alphanumeric, that is unique to a person within the event.

A "physical identifier" means a physical manifestation of an identifier that is carried by a person that is identified. A physical identifier can be a card with a magnetic stripe or a bar code, a RFID transmitter, or other means that can be manually or electronically read.

An "event manager" means the manager of an event, wherein the manager has identifying information about each patron. This information can include the identifier, the name and contact information for a patron (which can include the patron's email address), an image of the patron, information about groups of patrons (i.e. the relationships between the patrons), or other information.

A "groupID" is a unique identifier that is associated with a list of identifiers of patrons who are related to one another.

Ordering Images in a Gallery

Images are taken by photographers or by automated cameras (e.g. on thrill rides), generally using digital cameras. The images are then printed to create photographs that are shown in a gallery for the patrons to scan in order to decide whether to obtain one or more of the photographs. In general, patrons prefer to obtain images of themselves or related people, but if there are a very large number of photographs in the gallery, this process can be onerous and a disincentive for the patron to look for photographs.

It is far better for the photographs to be ordered so that all of the photographs from a person to be clustered geographically within the gallery for easy retrieval. There are a number of different types of ordering that are of use for such purposes.

Order by Characteristic

This is where the photographs are sequentially ordered according to a characteristic that discriminates among patrons, and for which patrons can identify their own characteristic. This could be an alphanumeric identifier, such as that carried on a physical identifier, the person's first or last name, their cabin number, time of embarkation, the last four letters of their telephone number, or other. It should be noted that this ordering does not need to be strict. For example, if there are cabin numbers from 2000 to 4000 on a cruise, the gallery could be organized by sections, such as by 100 cabin numbers (e.g. section A is 2300 to 2399), and within the section, the photographs could be unordered.

Order by Occasion

This is where the photographs are grouped according to occasion, and then within this higher level ordering, the photographs can be grouped according to a characteristic that discriminates among patrons, as in the previous paragraph. The patron would first go to the section of the gallery containing photographs of an occasion at which the patron was present, and then skip to the location in that subset of photographs with their characteristic (e.g. their last name).

No Order

This is where the photographs are unordered with respect to patron characteristic, but where all of the photographs for a patron or a group of patrons are gathered in roughly the same location within the gallery. That is, instead of the patron needing to search each time through all of the photographs in the gallery, once they locate their images once, they can return to the same location in the gallery each time. This method is of particular use for longer events (such as a cruise), where the photographs accumulate over a period of time in the gallery, and the patron might be expected to visit the gallery from time to time to find their photographs.

In the first two cases (Order by Characteristic and Order by Occasion), what is needed is one or both of two capabilities: identifying the specific patron or patrons within a photograph, and identifying a group of related patrons in the photographs.

In order to place the photographs into the correct locations within the gallery, it is a requirement that an identifying mark be placed on the photograph indicating the location in the gallery that the photograph should be placed. This identifying mark can be placed either on the front of the photograph, or on the reverse side of the photograph. Furthermore, the identifying mark can be either readable by a person without assistance, or it can be marked in a way that requires assistance. For example, if the mark is a bar code, it cannot be read by the person responsible for putting the photographs in their correct locations in the gallery, but it can be read by a person equipped with a bar code reader, which is preferably a portable bar code reader. The identifying mark can be either a physical location (e.g. a panel within in the gallery), or alternatively, it can be the characteristic by which the gallery is organized, as described above. For example, in the case of order by characteristic, the identifying mark can be the value of the characteristic by which the gallery is ordered. In the case of no order, the identifying mark can be a unique ID assigned to a person, or a unique ID assigned to a group of persons (for more information, see the section on groups below).

It should be appreciated that while the mark can be a visual indicator, it is also within the scope of the present invention that the mark be an electronic or other identifier that is machine readable. For example, bar codes or, alternatively, printable bar codes are now becoming available, would allow photographs to be read with machine assistance by employees of the event manager.

While it is possible to sort the photographs according to the characteristics above after printing, it is generally preferable to print the images in a sorted order, so that the photographs so produced will be in rough order geographically within the gallery, so as to reduce the amount of effort required to put the photographs into the correct locations.

It should be noted that in most cases, there will be photographs that will contain people that are not at the same location in the gallery. In some cases, this is not a problem, as people will be organized into groups, and the ordering within the gallery will not be on the basis of an individual characteristic, but rather on a group characteristic (e.g. being a member of a family, or having the same cabin number, or having booked a cruise at the same time). In other cases, however, the photograph will comprise people who will be ordered at multiple places in the gallery.

In these latter cases, it is often preferable to print multiple photographs of the same image, which are then placed at multiple places within the gallery. For example, if there is a large family reunion, and photographs for a first part of the family are placed in one section of the gallery, and photographs for a second part of the family are placed in another section of the gallery, it can be preferable to print two copies of photographs containing members of both the first and second parts of the family, who may want to purchase not only photographs of themselves, but also photographs of their relatives. In these cases, each photograph produced from the same image will preferably have a different mark that indicates the specific location within the gallery at which it should be placed. Furthermore, if the photographs are printed in order of their placement within the gallery as described above, the multiple photographs from the same image will be printed at different times.

Identifying Specific Patrons

In order to identify specific patrons by means of facial recognition, a means must be obtained of connecting the patron's name or other identifying information and the patron's face. In the prior art (e.g. U.S. Pat. No. 6,526,158 to Goldberg), this was accomplished by means of a camera mounted on a kiosk which additionally provided means (e.g. a keyboard attached to a computer) that allowed the patron to enter his identifying information. This means is within the spirit of the present invention, but in certain situations, obtaining a proper photograph of a patron in conjunction with the identifying information may be procedurally difficult. Examples of this are often found in large events (e.g. a cruise or a theme park), in which thousands or tens of thousands of people must be processed within a short period of time (the morning in a theme park, or embarkation for a cruise ship).

In some of these cases (e.g. cruises), security or other identification images (hereinafter referred to as "security images") are taken of the patrons, which are then associated with identifying information by the event manager. This allows the combination of a person identified as a set of faces with a patron's identifying information. The manner in which this is done is the following. In a first step, the security images are matched to the set of persons indexed from the collection of images by facial recognition, matching thereby a set of the indexed persons to a set of the security images. Some fraction of the indexed persons will, in general, not be identified with security images due either to the inaccuracies of facial recognition and/or inadequacies of either the security images or of the images that comprise the collection. These unidentified indexed persons will then be matched with the unmatched security images by other means, which can involve the use of a manual indexing interface. In such an interface, faces from unidentified indexed persons will be presented alongside unmatched security images, and an operator can match pairs of persons and images by visual inspection.

This matching process can be improved by knowledge of the grouping patterns of patrons. For example, on a cruise, it is often known the names and ages, and sometimes the genders, of the passengers traveling together (through their sharing a booking identifier). If the gender is not known, it can often be inferred from the name of the person, such as through a lookup table of known gender-associated names (and in which certain persons may have a gender-ambiguous name). If it is known by the event manager that a group of 5 patrons is traveling together, in which one patron is an adult male, another patron is an adult female, and then further one teenage male, one teenage female and then one elementary school age female, the operator, on seeing an image from the collection, can input the age and gender distribution of people within the image, which can then restrict the security images to groups with a similar matching of people presented to the operator for potential matching.

At the conclusion of this stage, each indexed person is associated with identifying information. The photographs that are generated by the images can then be ordered and presented in the gallery in the manner described above.

Presenting Photographs by Groups

In general, patrons do not simply want photographs of themselves, but also of related persons. For example, in a cruise, there may be a person who is a member of an immediate family group, which is part of a larger family reunion, which is occurring during an even larger church group cruise. In such a case, a particular patron will almost certainly want to see photos from at least their immediate family, most likely from their family reunion, and possibly the church group. In order to accommodate these desires, methods must be put into place to be able to generate the group associations either manually or automatically.

It should also be noted that the ability to view or purchase photographs of another person can be under the control of the person in the photograph. In the case described in the previous paragraph, for instance, a member of the church group may want to restrict such viewing or purchase to people within the member's immediate family for personal privacy reasons.

The most straightforward method of providing such access and restrictions is through a manual interface. Such an interface, for example, might comprise a keyboard in which a patron sets a) an access list with the names or other identifiers of other patrons that will have access to the patron's photographs, and/or b) a desired list, in which the patron lists the names or other identifiers of patrons whose photographs the patron would like to see.

Instead of, or in addition to, the user entering patron names through a keyboard, the patron can alternatively select the patron names from a list of patrons at the event. It should be noted that this method of selection can be onerous in the case of events with hundreds or thousands of patrons. In such cases, it is preferred that information about groups that is collected by the event manager can simplify the operation. For example, if the event manager has collected information about immediate families, such information can be used to present to the patron the names or identifying information of patrons that are most likely to be of interest to a patron. This information can be directly in terms of familial relations, but alternatively, can also be in terms of people sharing a cruise cabin or hotel room—people with that level of intimacy will generally be interested or satisfied with sharing photographs.

Another method of establishing groups is to determine those patrons who are in one or more images together. One system for carrying out this method is illustrated in FIG. 1. That is, given two patrons A and B, there will be images with only A (IA), those with only B (IB), and those with both A and B (IAB). One can then compute an association index relating A to B (A2B), and conversely, B to A (B2A). Convenient equations for such associations are:

$$A2B=IAB/(IA+IAB)$$

$$B2A=IAB/(IB+IAB)$$

though many other equations can be written as well. The common feature for such equations is that the more related A and B are to one another, the higher the association index. Other equations that can be used include:

$$A2B=(IAB/(IA+K))^{exp}$$

$$B2A=IAB/(IB+K)^{exp}$$

Where K is either a constant term or some other number that prevents the denominator from becoming zero should there be no images of A or B by themselves, and exp is an exponent that modulates the magnitude of the effects.

It should be noted that the association index is not normally symmetrical. For example, patron A may always be in images with patron B, but patron B may be in many images without patron A. In such a case, the index A2B will generally be higher than the index B2A.

Given these indices, one can automatically generate relationships between patrons that can determine both access and restriction. That is, a rule can be used that all patrons with an association to a given patron above a certain predetermined threshold identity index will be presented with images as if those images were their own. Furthermore, all patrons with an association to a patron below a certain predetermined threshold restriction index will be restricted from seeing images of the patron. It can be that the identity index and the restriction index are the same, but it more generally be the case that the identity index and the restriction index will be different (i.e. there will be a class of images that are not of the same group identity as the patron, but for which the patron is still importantly related and for which the patron will want to see images and the other patron will be willing for the patron to see). Expressed alternatively, the identity index facilitates people in the same group to view one another's images, so that they see each other's images as if they were of themselves, whereas the restriction index disallows people that are not in the same group to view one another's images. Outside of these indices, the viewer has the option whether or not to see such images, or to allow other to see such images, or the default access is determined by the specific indices.

It should be further noted that there can be more complex relationships between patrons than direct association indices. For example, consider three patrons A, B, and C, in which A is highly related to B (i.e. A2B and/or B2A is large), and B is highly related to C (i.e. B2C and/or C2B is large), but A is not highly related to C (i.e. A2C and C2A are small). In such cases, a relationship can then be determined through the combination of the multiple individual relationships. For example, the relationship can be the product of the two relationships—that is, a "computed A2C" can be derived as A2B times B2C, and a "computed C2A" can be computed as C2B times B2A, and the higher of the direct and computed relationships can be used.

It should be noted that instead of a product, other mathematical relationships can be used, and in particular, the use of exponents can be used to modify the behavior of the relationships. For example, in the case above, a more general relationship can be expressed as $A2C=(A2B)^K \times (B2C)^K$, where the value K can be considered the "combined relationship constant".

Note, however, that in every case, the relationship between two people can take place through multiple paths or chains or chains of associations. For example, the relationship between D and F could be determined through a variety of paths such as:

D2F directly
D2G and G2F
D2H and H2F
D2J and J2L and L2F

The total computed relationship between D and F can be alternatively computed as being from the combination of all of the different paths or chains of association linking the two people. This computation can take a number of different forms, of which one is described below:

$$D2F=1-[(1-D2F^K)(1-(D2G^K \times G2F^K))(1-(D2H^K \times H2F^K))(1-(D2J^K \times J2L^K \times L2F^K))]^P$$

where combined relationship constant K and combined inverse relationship constant P are chosen empirically. For example, if families on a cruise are the desired granularity of relationship desired, for a cruise in which the correct relationships are known or can be inferred (e.g. from the booking information), the values of P and K can be varied so as to minimize some combination of false-negative relationships (i.e. members of a family that are not associated with one another) and false-positive relationships (i.e. members of two different families that are incorrectly associated with one another). The combination on which to minimize can be, for example, a sum of the number of false-positive and false-negative associations, each weighted according to the difficulty that the given false association has to the system. The weighting can be through a linear sum—e.g. combination=$K_{fp}$×false-positives+$K_{fn}$×false-negatives, where $K_{fp}$ and $K_{fn}$ are predetermined constants. Alternatively, the weighting can be through exponential weighting—e.g. combination=false-positives$^Q$+false-negatives$^Q$, where Q is a predetermined constant. The exponential weighting has the advantage that a value of Q>1 will tend to balance out the number of false-positives and false-negatives, so that one does not grow large at the expense of the other.

As the number of paths between two persons can be very large, the computation can be chosen so that it takes into account only those paths of a certain distance, where that distance can preferably include a maximum three terms, and more preferably include a maximum of two terms (e.g. D2F computed from the two terms D2E and E2F). By using these multiple terms, relationships among related people can reinforce one another, so that families show strong relations to one another.

It should be appreciated that groups can be created by different means. For example, on a cruise or other event for which the event manager has limited information about patrons at the event, the groups can be created as described above using restriction and identity index thresholds. In addition, the groups can alternatively be created by consideration of the cabins or booking information—it can be often assumed that patrons sharing a cabin or having booked a cruise at the same time are tightly related. This information can be used in conjunction with one another. For example, all of the patrons within a cabin can be used to create a "core group", functioning as a single entity with use of the methods above to determine group membership.

In a gallery, it can be that photographs of people within a certain association index will be displayed in close proximity to one another. Thus, if a mathematical graph is constructed of all persons as nodes, with their association index as edges, all edges less than a certain threshold association index can be removed, and the photographs of people who are still connected within the graph will be displayed in proximity to one another. It is apparent that a precondition for the successful implementation of this method is that after removal of edges below a certain association index, not all people in the collection should still be connected. One method of ensuring this is to increase the association index gradually, until such point that the number of groups is at a predetermined level (e.g. where the number of groups is a given fraction of the number of people).

Hierarchical Groups

As mentioned above, groups can be hierarchically organized. Often, these hierarchical organizations will not be clear-cut, but will have "fuzzy" boundaries determined by psychological associations. For example, if a family group is determined by brother-sister-father-mother relationships, in three generations with multiple children, it can be hard to determine which of the relationships are more important than others. A "nuclear family" designation may also be insufficient, if a grandparent is living with a child and grandchildren. A designation of "living in the same house" may also be insufficient if some children are away at college or recently graduated.

Furthermore, the specific hierarchical organization of groups will generally not be known to the event manager. In order to handle these hierarchies, two methods are generally available. In a first method, association indices between persons and similar association indices between groups can be used to automatically infer the hierarchical relationships. In a second method, manual interfaces are provided to patrons to indicate the hierarchies.

As before regarding persons related to groups, there are two types of access restrictions or availabilities. Firstly, a particular group can have automatic access to a larger group to which the particular group is associated. Thus, a "nuclear family" on a cruise should, in general, be granted access to images of all of the members of a family reunion with which they are associated. Conversely, a particular group may want to limit access to a larger group or to non-associated people. For example, a family on a cruise with members of a church group may want to restrict access to the church group of images in which only members of the family are represented.

One method of grouping patrons hierarchically is to gradually increase the threshold for the restriction or identity index. As the threshold is increased, groups that were separate will become connected via patrons with associations below the newly increased threshold, thereby forming a cluster of groups. In this manner, a hierarchical association of groups can be formed, along with an indication of the degree of association, through the lowest index threshold at which the groups are joined into a cluster. It should be noted that, using this method, if there are two groups A and B, and they are joined into a cluster C, then all of the individual members of A and B are also in C.

It is also possible for two persons in a group to be in separate hierarchical groups. Consider, for example, a child in a family at a resort, who participates in a children's program at the resort. The child is a member of the family group, and also a member of the children's program, but the other members of the family are not in the children's program. By relaxing the index threshold to create hierarchical groups, as soon as the child is included in the group of those participating in the children's program, so will the other members of his family.

An alternative method that accounts for a particular person being in multiple groups is to determine group membership by the number and strengths of links between new persons added to a group. Consider an event of a number of people, representing this group as a mathematical graph in which nodes represent people and edges represent associations. If two people are not in an image together, there is no edge connecting the nodes representing the two people. To measure the level of connectedness of members of a potential group, one method is to exhaustively traverse all nodes, starting with a "seed" node as a group. The next step is to sequentially measure the overall connectedness of the group when adding a "test" node. If the measure of connectedness increases, then the test node is added to the group. By this means, only test nodes increasing the overall connectedness of the graph contribute to the group.

The measure of overall connectedness has in the numerator a term related to the total number of edges within nodes in the group, which can be weighted by the strength of the edges. The denominator has a term related to the total number of nodes within the group. One preferable measure of connectedness is:

$$\text{connectedness} = (\text{sum of edges})/(\text{sum of nodes})^{gamma}$$

where gamma is a number generally greater than zero and less than 1 (that is, as the number of nodes increases, the number of edges increases sub-linearly).

It should be appreciated that by this algorithm, a single node can be a member of many groups, depending on the seed node and the sequence of test nodes used. It should also be appreciated that many different seed nodes and sequences will yield the same distribution of groups. There are many means of exhaustively traversing the graph, using recursive techniques, which will find all groups within a graph.

It is also within the spirit of the present invention to specify a predetermined minimum connectedness ("MinCon"), which can be used in two different ways. In a first way, nodes are added to a group until the connectedness drops below MinCon, and then the search for additional members of the current group is stopped (this can be used in conjunction with or instead of the prior test, of seeing whether the connectedness decreases with a new node). In a second way, after a group is defined as above, if the connectedness is below MinCon, the group is not retained.

For displaying photographs in a gallery of people with overlapping groups in this manner, a number of different display organizations can be used. In a first manner, each group can be assigned a location, and all photographs of which a certain fraction of the people represented within the photograph are part of the group can be presented. In another organization, photographs can be arranged according to a two-dimensional projection of the graph, with more related groups (i.e. with larger numbers of people in common) being closer together, so that people looking at photographs of one group will be more likely to see photographs of people in related groups.

The use of hierarchical groups, however, is most useful when presented in a kiosk or similar electronic display as images. In this format, a person coming to the kiosk would be able to see not only all of the images in which the person is represented, but all of the images from the groups of which they are a member. This display can be extended to include people in groups including people who are in groups with the person at the kiosk. An example of this latter display would be for the mother of a child who is in a children's program group being able to see all of the images from the children's group, even though she is an adult and not a member of the children's group.

MANY EMBODIMENTS WITHIN THE SPIRIT OF THE PRESENT INVENTION

It should be apparent to one skilled in the art that the above-mentioned embodiments are merely illustrations of a few of the many possible specific embodiments of the present invention. It should also be appreciated that the methods of the present invention provide a nearly uncountable number of arrangements of indicators, tags, detectors, mixing means, force application means and more.

Numerous and varied other arrangements can be readily devised by those skilled in the art without departing from the spirit and scope of the invention. Moreover, all statements herein reciting principles, aspects and embodiments of the present invention, as well as specific examples thereof, are intended to encompass both structural and functional equivalents thereof. Additionally, it is intended that such equivalents include both currently known equivalents as well as equivalents developed in the future, i.e. any elements developed that perform the same function, regardless of structure.

It should be noted that while the identification means described above comprises facial recognition, it is also possible to use other means for determining the identities of the patrons in images. For example, the patrons can wear radio frequency identifiers, or alternatively, visual identifiers (such as color-coded or bar coded identifiers) on tags. A number of such identification schemes are described in U.S. Pat. No. 6,526,158 to Goldberg. With such alternative identification, the issues of distribution, grouping of photographs, and determining which patron's images to display to other patrons, are also addressed with the present invention.

In the specification hereof any element expressed as a means for performing a specified function is intended to encompass any way of performing that function. The invention as defined by such specification resides in the fact that the functionalities provided by the various recited means are combined and brought together in the manner which the specification calls for. Applicant thus regards any means which can provide those functionalities as equivalent as those shown herein.

What is claimed is:

1. A method for associating persons, who are represented in a collection of images, into a group, using an automated facial recognition engine, comprising:

Identifying, using the facial recognition engine, a first and a second person in each image in the collection of images using the automated facial recognition engine;

Determining, using the facial recognition engine, a first number comprising the number of images in which the first person is present;

Determining, using the facial recognition engine, a second number comprising the number of images in which both the first person and the second person are present;

Computing, using the facial recognition engine, an association index between a first person and a second person from the ratio of the second number to the first number;

Grouping, using the facial recognition engine, the first person and the second person in a group if the association index between the first and second person exceeds a certain predetermined threshold value.

2. The method of claim 1 wherein the ratio of the first and the second number is raised to a predetermined power.

3. The method of claim 1 wherein computing further comprises using the facial recognition engine to compute a second association index between a first person and a second person from a third number being the number of images in which the second person is represented and from the second number.

4. The method of claim 1 wherein computing further comprises using the facial recognition engine to combine the association index between the first person and a third person with the association index between the third person and the second person.

5. The method of claim 4 wherein combining comprises using the facial recognition engine to multiply a term related to the association index between the first person and the second person with a term related to the association index between the second person and the third person.

6. The method of claim 4 wherein computing further comprises using the facial recognition engine to combine the association indices of multiple chains of association between the first person and the second person.

7. The method of claim 1 further including allowing the same access of images of the first person to the second person as if the images were of the second person, if the first person and the second person are grouped in the same group.

8. The method of claim 1 further including disallowing access of images of the first person to the second person, if the first person and the second person are not grouped in the same group.

9. The method of claim 1 further including clustering a first group comprising the first person with a second group comprising the second person by using the facial recognition engine to increase the threshold value until the threshold value exceeds the association index between a person in the first group and a person in the second group.

10. The method of claim 1, comprising:
calculating, using the association index between the current members of the group and an additional person; and
admitting the additional person to the group if the association index exceeds a threshold.

11. The method of claim 10 wherein calculating comprises a ratio of a measure of the number of times persons in the group are represented in the same image to a power of the number of persons in the group, wherein the power is greater than zero and less than or equal to 1.

12. The method of claim 10 wherein the threshold is the association of the group without the additional person.

* * * * *